US009618732B2

(12) United States Patent
Tsai et al.

(10) Patent No.: US 9,618,732 B2
(45) Date of Patent: Apr. 11, 2017

(54) LENS STRUCTURE

(71) Applicant: ABILITY ENTERPRISE CO., LTD., Taipei (TW)

(72) Inventors: Hsiang-Yu Tsai, Taipei (TW); Wen-Chieh Cheng, Taipei (TW)

(73) Assignee: ABILITY ENTERPRISE CO., LTD., Taipei (TW)

( * ) Notice: Subject to any disclaimer, the term of this patent is extended or adjusted under 35 U.S.C. 154(b) by 139 days.

(21) Appl. No.: 13/708,529

(22) Filed: Dec. 7, 2012

(65) Prior Publication Data

US 2013/0148209 A1 Jun. 13, 2013

(30) Foreign Application Priority Data

Dec. 7, 2011 (TW) .............................. 100145155 A

(51) Int. Cl.
*G02B 15/14* (2006.01)
*G02B 7/10* (2006.01)

(52) U.S. Cl.
CPC .............. *G02B 15/14* (2013.01); *G02B 7/10* (2013.01)

(58) Field of Classification Search
CPC .......... G02B 15/14; G02B 7/10; G02B 15/22; G02B 7/04; G02B 9/34; G02B 13/009; G02B 13/02; G02B 23/145; H04N 5/2254; G03B 3/02

USPC .............. 359/694, 699, 700, 701, 702, 804; 396/72–88

See application file for complete search history.

(56) References Cited

U.S. PATENT DOCUMENTS

| 2002/0135887 | A1* | 9/2002 | Nomura ................... G02B 7/10 |
| | | | 359/699 |
| 2003/0081325 | A1* | 5/2003 | Nomura et al. .............. 359/700 |
| 2006/0176587 | A1* | 8/2006 | Homme ................. G03B 17/04 |
| | | | 359/819 |
| 2010/0328785 | A1* | 12/2010 | Nomura ........................ 359/699 |

FOREIGN PATENT DOCUMENTS

| CN | 100487551 C | 5/2009 |
| JP | 2008-249982 A | 10/2008 |
| JP | 2011-158919 A | 8/2011 |
| TW | I353464 B | 12/2011 |

* cited by examiner

*Primary Examiner* — Scott J Sugarman
*Assistant Examiner* — Mustak Choudhury
(74) *Attorney, Agent, or Firm* — Rabin & Berdo, P.C.

(57) ABSTRACT

A lens structure is provided. The lens structure comprises a first barrel and a second barrel. The first barrel comprises a first pin and a second pin. The second barrel comprises a continuous groove. Wherein in a wide-angle end, the first pin is located in the continuous groove and the second pin is located outside of the second barrel. Wherein in a telephoto end, the first pin is located outside of the second barrel and the second pin is located in the continuous groove.

15 Claims, 7 Drawing Sheets

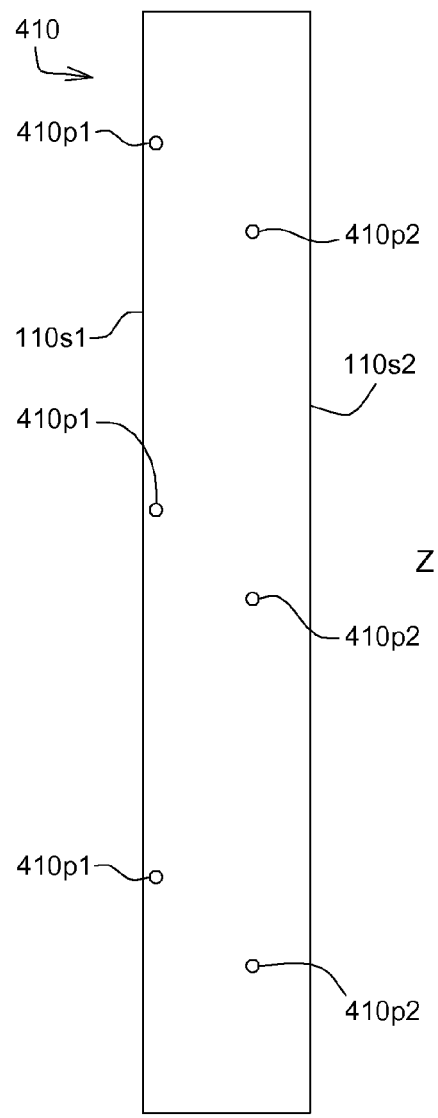
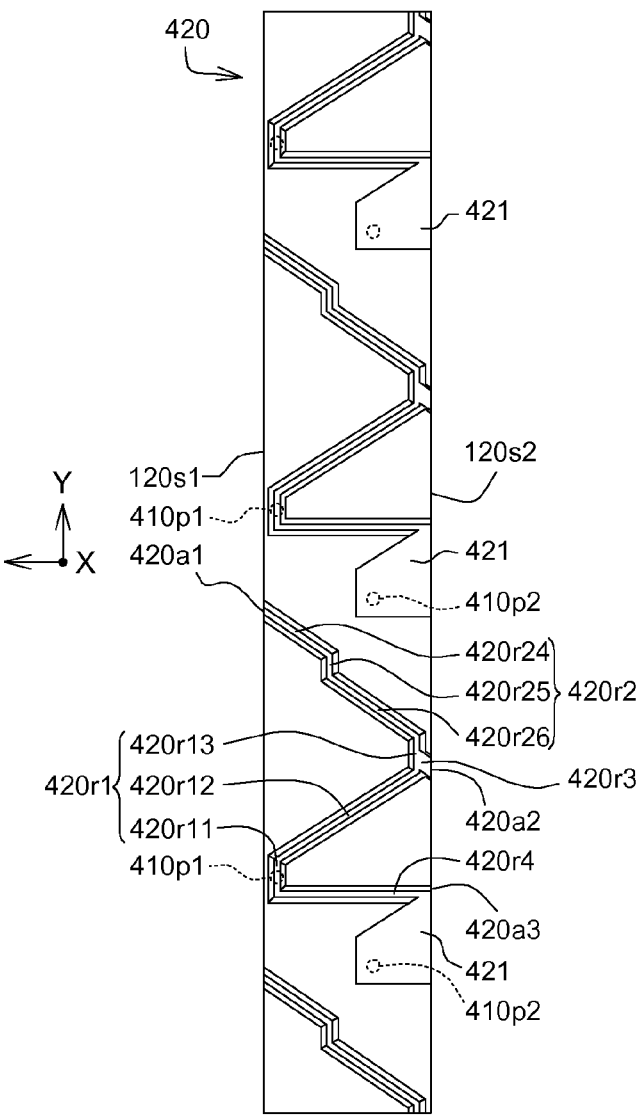
FIG. 9                    FIG. 10

LENS STRUCTURE

This application claims the benefit of Taiwan application Serial No. 100145155, filed Dec. 7, 2011, the subject matter of which is incorporated herein by reference.

BACKGROUND OF THE INVENTION

Field of the Invention

The invention relates in general to a lens structure, and more particularly to a lens structure with a prolonged optical zooming path.

Description of the Related Art

Along with the advance in technology, digital camera mechanism has been widely used in various digital products such as digital camera, digital video recorder, mobile phone, personal digital assistant (PDA). The digital camera mechanism comprises a lens structure and an image sensor. The lens structure focuses an image on the image sensor, and then the image sensor converts an optical image signal into an electrical signal.

Conventional lens structure comprises a number of barrels which move relatively to each other. A forwarding barrel of the barrels has a groove, which defines an optical zooming path. Through the groove, the forwarding barrel may move in a straight line to change the focus.

However, as the thickness of the lens structure is reduced, the length of the forwarding path of the forwarding barrel is subjected to the thickness of the barrel connected thereto, such that the length of the optical zooming is restricted indirectly.

SUMMARY OF THE INVENTION

The invention is directed to a lens structure with a prolonged optical zooming path.

According to an embodiment of the present invention, a lens structure is provided. The lens structure comprises a first barrel and a second barrel. The first barrel comprises a first pin and a second pin. The second barrel comprises a continuous groove. Wherein at a wide-angle end, the first pin is located in the continuous groove and the second pin is located outside the second barrel. Wherein at a telephoto end, the first pin is located outside the second barrel and the second pin is located in the continuous groove.

According to another embodiment of the present invention, an electronic apparatus comprising the lens structure described above is provided.

According to another embodiment of the present invention, a lens structure is provided. The lens structure performs zooming from a wide-angle end to a telephoto end. The lens structure comprises a first barrel and a second barrel. The first barrel first barrel comprises a first pin group and a second pin group, and the second barrel comprises a first surface and a continuous groove. Wherein form the wide-angle end to the telephoto end, the first pin group slides in accordance with the continuous groove and be detached from the second barrel from the first surface. Wherein during the first pin group being detached from the second barrel, the second pin group slides in accordance with the continuous groove.

According to another embodiment of the present invention, an electronic apparatus comprising the lens structure described above is provided.

According to another embodiment of the present invention, a lens structure is provided. The lens structure performs zooming between a wide-angle end and a telephoto end. The lens structure comprises a first barrel and a second barrel. The first barrel comprises a first pin group and a second pin group, and the second barrel comprises a first surface and a continuous groove. Wherein from the wide-angle end to the telephoto end, the first pin group slides along the continuous groove to be detached from the second barrel from the first surface. Wherein during the first pin group being detached from the second barrel, the second pin group slides along the continuous groove.

The above and other aspects of the invention will become better understood with regard to the following detailed description of the preferred but non-limiting embodiment(s). The following description is made with reference to the accompanying drawings.

BRIEF DESCRIPTION OF THE DRAWINGS

FIG. 9 shows an expansion diagram of a first barrel of a lens structure according to another embodiment of the invention;

FIG. 10 shows an expansion diagram of a second barrel of a lens structure according to another embodiment of the invention;

DETAILED DESCRIPTION OF THE INVENTION

Figure 1:
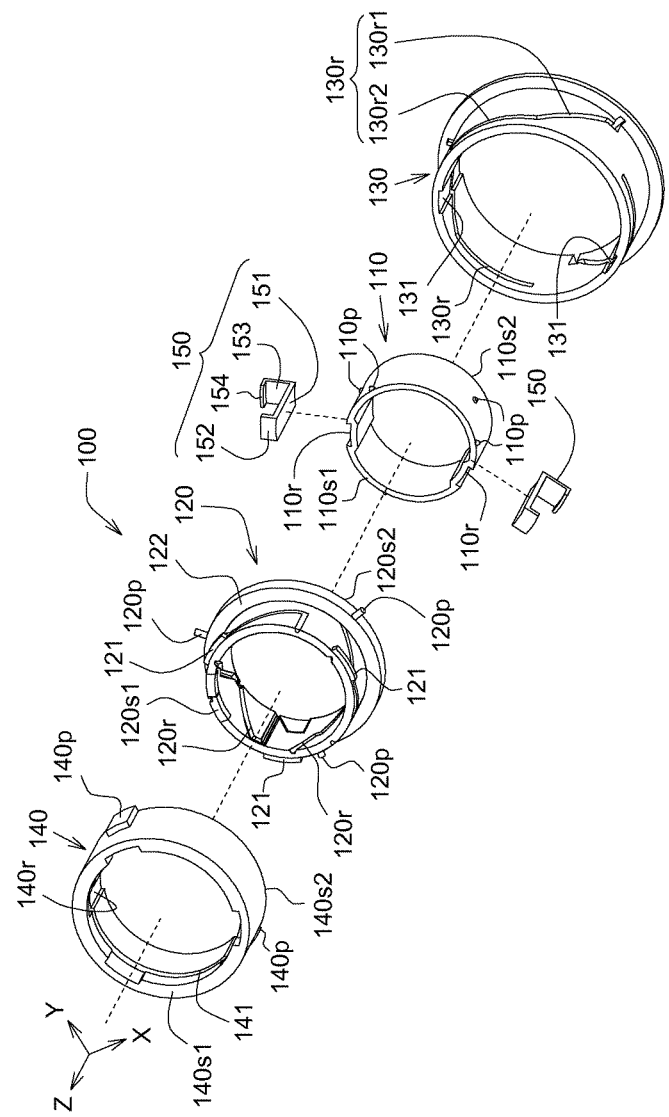
FIG. 1 shows a decomposition diagram of a lens structure according to an embodiment of the invention.

Referring to FIG. 1, a decomposition diagram of a lens structure according to an embodiment of the invention is shown.

The lens structure 100 may be widely used in various electronic apparatus with image capturing function, and may be realized by such as digital camera, digital video recorder, mobile communication device or personal digital assistant (PDA).

The lens structure 100 comprises a first barrel 110, a second barrel 120, a third barrel 130, a fourth barrel 140 and at least one guider 150. In the present embodiment, the quantity of the guider 150 is exemplified by two, and the two guiders 150 are disposed in an asymmetric manner. That is, the circular angle between the two guiders 150 is not 180 degrees. In another embodiment, two guiders 150 may be disposed in a symmetric manner. That is, the circular angle between the two guiders 150 is 180 degrees.

As indicated in FIG. 1, the first barrel 110 comprises at least one first groove 110r and at least one first pin 110p, and the second barrel 120 comprises at least one second pin 120p. The first pin 110p of the first barrel 110 may slide in accordance with the second groove 120r of the second barrel 120. In one embodiment, the first groove 110r is realized by a forwarding slot, wherein "forwarding slot" denotes the slot structure allowing the barrel to move in a straight line. In addition, the quantity of the first pin 110p of the first barrel 110 corresponds to that of the second groove 120r of the second barrel 120, and is such as two, three or any other number.

The first barrel 110 further comprises a first surface 110s1 and a second surface 110s2 opposite to the first surface 110s1. The first groove 110r extends to the second surface 110s2 from the first surface 110s1 of the first barrel 110. That is, the first groove 110r has two openings exposed on the first surface 110s1 and the second surface 110s2 respectively.

In one embodiment, the first groove 110r only extends along the Z-axis, such that when the second barrel 120 rotates and drives the first barrel 110 to move, the first barrel 110 is restricted by the guider 150 (the guider 150 is restricted inside the first groove 110r), and the first barrel 110 and the guider 150 move with respect to each other in a straight line. The Z-axis is such as the direction of the center axis of the barrel or the optical axis of the lens structure 100.

The lens structure 100 further comprise a lens group (not illustrated) disposed inside the first barrel 110. The lens group is formed by such as at least one concave lens and/or at least one convex lens. By moving the first barrel 110 in a straight line, the position of the lens group may thus be changed.

Figure 2:
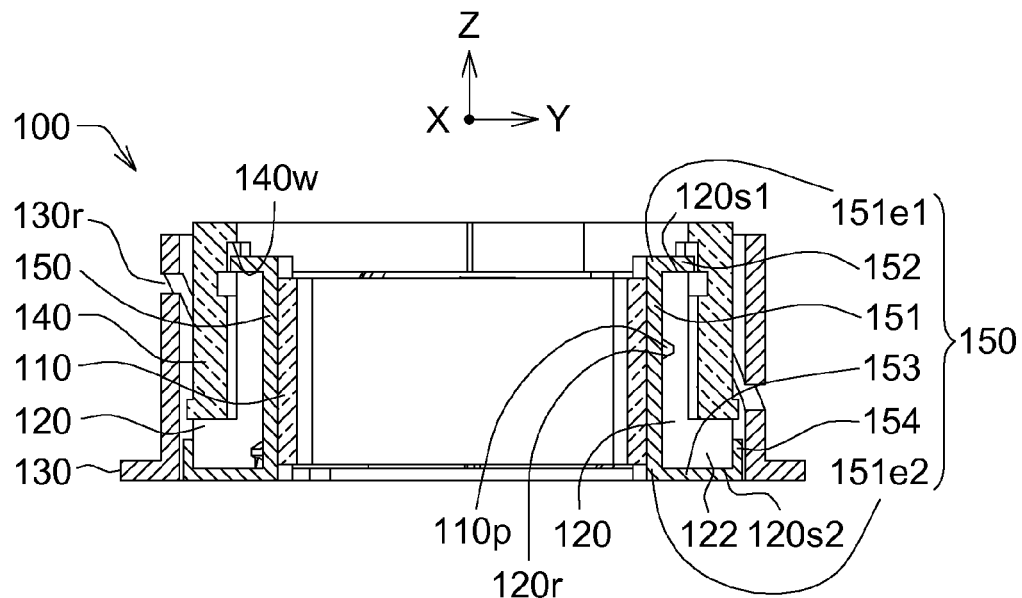
FIG. 2 shows a cross-sectional view of the lens structure of FIG. 1 being at a close end.

Referring to FIG. 2, a cross-sectional view of the lens structure of FIG. 1 being at a close end is shown. The guider 150 slides in accordance with the first groove 110r of the first barrel 110. The guider 150, being guided by the first groove 110r, may move in a straight line along the Z-axis.

The guider 150 comprises a main body 151, a first limiting portion 152 and a second limiting portion 153. The main body 151 has a first end 151e1 and a second end 151e2 opposite to the first end 151e1. The first limiting portion 152 is connected to the main body 151 and located in the first end 151e1 or between the first end 151e1 and the second end 151e2. In the present embodiment, the first limiting portion 152 is connected to the first end 151e1 of the main body 151, and the second limiting portion 153 is connected to the second end 151e2 of the main body 151.

As indicated in FIG. 2, the second barrel 120 is disposed inside the third barrel 130. By restriction on connection between the second barrel 120 and the first limiting portion 152, the second barrel 120 may drive the guider 150 to move. In detail, in one embodiment, the second barrel 120 is disposed between the first limiting portion 152 and the second limiting portion 153, such that second the barrel 120 may not be detached from the guider 150, and enabling the guider 150 and the second barrel 120 simultaneously move. In the present embodiment, the second barrel 120 has a first surface 120s1 and a second surface 120s2 opposite to the first surface 120s1. The first surface 120s1 and the second surface 120s2 of the second barrel 120 are connected to the first limiting portion 152 and the second limiting portion 153 respectively, but the present embodiment is not limited thereto.

As indicated in FIG. 2, the guider 150 further comprises a third limiting portion 154, the third limiting portion 154 is connected to the second limiting portion 153 and extends towards the first limiting portion 152 along Z-axis, such that the second barrel 120 is disposed among the first limiting portion 152, the second limiting portion 153 and the third limiting portion 154. In the present embodiment, since the connection between the third limiting portion 154 and the flange 122 of the second barrel 120, the guider 150 is stopped by the flange 122 of the second barrel 120 when the second barrel 120 rotates, and the shaking degree of the guider 150 is thus reduced.

As indicated in FIG. 2, the second limiting portion 153 and the first limiting portion 152 are substantially parallel to each other. In another embodiment, the second limiting portion 153 and the first limiting portion 152 may not be parallel to each other. For example, an obtuse or acute angle is contained between the second limiting portion 153 and the first limiting portion 152.

As indicated in FIG. 2, by rotating the second barrel 120, the first barrel 110 is able to close to a close end, or performs zooming between a wide-angle end and a telephoto end. The second barrel 120 may rotate around the Z-axis, and the Z-axis is such as a center axis of the barrel or an optical axis of the lens structure 100.

Figure 3:
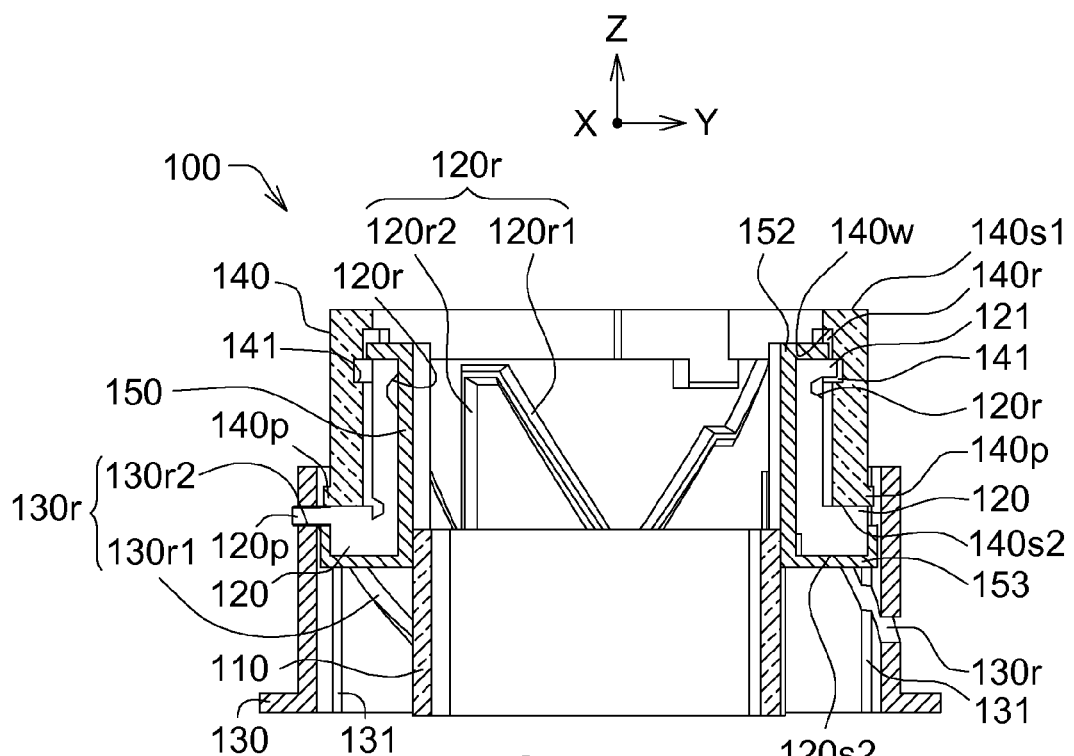
FIG. 3 shows a cross-sectional view of the lens structure of FIG. 1 being at a wide-angle end.

Referring to FIG. 3, a cross-sectional view of the lens structure of FIG. 1 being at a wide-angle end is shown. During the process in which the second barrel 120 of FIG. 1 rotates around the Z-axis and moves along the Z-axis in a straight line, the second barrel 120 may drive the guider 150 to move forward or backward in a straight line along the Z-axis. Furthermore, since the second barrel 120 is restricted by the first limiting portion 152 of the guider 150, the second barrel 120 may simultaneously drive the guider 150 to move when the second barrel 120 rotates. In the present embodiment, since the guider 150 moves in a straight line along the first groove 110r of the first barrel 110, the second barrel 120 may drive the guider 150 to move in a straight line. That is, during the process in which the second barrel 120 is transferred to the wide-angle end from the close end, the second barrel 120 rotates and moves in a straight line simultaneously. Besides, since the first barrel 110 is restricted by the guider 150, the first barrel 110 accordingly moves in a straight line.

As indicated in FIG. 3, during the process in which the lens structure 100 is transferred to the wide-angle end from the close end, the first barrel 110 and the second barrel 120 respectively move in opposite directions. When the lens structure 100 is at the wide-angle end (FIG. 3), the first barrel 110 relatively moves toward the second surface 120s2, such that the first barrel 110 is detach from the second barrel 120, and protruded to be over the second surface 120s2 of the second barrel 120 and the guider 150.

As indicated in FIG. 3, the second barrel 120 comprises at least one second groove 120r and at least one second pin 120p. The second groove 120r of the second barrel 120 comprises at least one rotation slot 120r1 and at least one forwarding slot 120r2. When the second barrel 120 rotates, the first pin 110p of the first barrel 110 is guided by the second groove 120r of the second barrel 120, such that the first barrel 110 performs a movement with respect to the second barrel 120. Such movement depends on the rotation slot 120r1 and the forwarding slot 120r2. Moreover, the extension method of the second groove 120r exemplified in the present embodiment is only one example of the extension methods of the second groove 120r; however, such exemplification not meant to be limiting.

As indicated in FIG. 3, the third barrel 130 comprises at least one third groove 130r. The second pin 120p of the second barrel 120 may slide in accordance with the third groove 130r of the third barrel 130, such that the second barrel 120 is able to rotate and move forward or backward in a straight line with respect to the third barrel 130. In addition, the quantity of the second pin 120p of the second barrel 120 corresponds to that of the third groove 130r of the third barrel 130, and is such as two, three or any other number.

In the present embodiment, the third groove 130r comprises a first rotation slot 130r1 and a second rotation slot 130r2, wherein the first rotation slot 130r1 and the second rotation slot 130r2 are interconnected to each other. When the lens structure 100 is at the wide-angle end (shown in FIG. 3), the second pin 120p of the second barrel 120 is disposed inside the second rotation slot 130r2 of the third groove 130r.

"Rotation slot" denotes the slot structure allowing the barrel to rotate, such exemplification not meant to be limiting.

As indicated in FIG. 3, in one embodiment, the first rotation slot 130r1 extends along and around the Z-axis, such that the first rotation slot 130r1 may guide the barrel moved with the third rotation groove 130r1 to simultaneously move in a straight line and rotate along Z-axis. In another example, the second rotation slot 130r2 only extends around the Z-axis, and is thus able to guide the barrel connected the third barrel 130 to rotate only, wherein "extend around the Z-axis" substantially means "extend along the outer circumferential direction of a barrel". In another embodiment, the second rotation slot 130r2 may simultaneously extend along and around the Z-axis. However, the extension method of the third groove 130r is not limited to the exemplification in the embodiments of the invention.

As indicated in FIG. 3, the third barrel 130 further comprises at least one fifth groove 131, and the fourth barrel 140 comprises at least one fourth guiding pin 140p. The fourth guiding pin 140p and the guider 150 may slide in accordance with the fifth groove 131. That is, the fourth guiding pin 140p and the guider 150 share the fifth groove 131. In the present embodiment, the fifth groove 131 is such as a forwarding slot, such that the fourth barrel 140 and the guider 150 may move in a straight line along the fifth groove 131. Thus, since the first barrel 110 is restricted by the guider 150, the first barrel 110 may only move in a straight line with the guider 150.

As indicated in FIG. 3, the second barrel 120 comprises at least one protrusion portion 121, the fourth barrel 140 comprises a ring groove 141, and the protrusion portions 121 of the second barrel 120 may slide in accordance with the ring groove 141 of the fourth barrel 140. In the present embodiment, two protrusion portions 121 are separately disposed. In detail, the protrusion portions 121 are adjacent to the first surface 120s1 of the second barrel 120.

In another embodiment, the protrusion portions 121 may be realized by a closed ring or an open ring structure. The ring groove 141 is such as a rotation slot. When the protrusion portions 121 move inside the ring groove 141, the second barrel 120 may drive the fourth barrel 140 to move with respect to each other.

As indicated in FIG. 3, the fourth barrel 140 further comprises at least one fourth groove 140r along which the guider 150 may slide. In the present embodiment, the fourth groove 140r is such as a forwarding slot, such that the guider 150 may move in a straight line along the fourth groove 140r.

As indicated in FIGS. 1 and 3, the fourth barrel 140 has a first surface 140s1 and a second surface 140s2 opposite to the first surface 140s1. The fourth groove 140r extends towards the first surface 140s1 from the second surface 140s2. In the present embodiment, the fourth groove 140r does not extend to the first surface 140s1 but forms a side wall 140w on one end of the fourth groove 140r. In another embodiment, the fourth groove 140r may extend to the first surface 140s1 from the second surface 140s2. That is, the fourth groove 140r has two openings exposed on the first surface 140s1 and the second surface 140s2.

Figure 4:
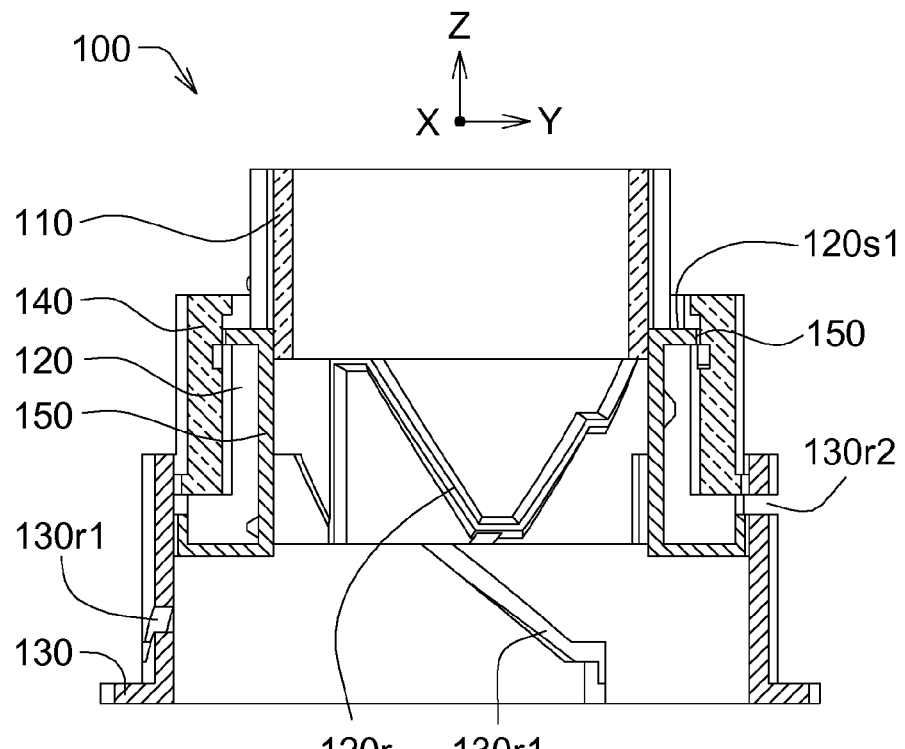
FIG. 4 shows a cross-sectional view of the lens structure of FIG. 1 being at a telephoto end.

Referring to FIGS. 3 and 4, a cross-sectional view of the lens structure of FIG. 1 being at a telephoto end is shown. When the second barrel 120 in the wide-angle end continues to rotate, the second pin 120p of the second barrel 120 rotates along the third groove 130r. In the present embodiment, during the process in which the second barrel 120 is transferred to the telephoto end from the wide-angle end, the second barrel 120, being guided by the second rotation slot 130r2, rotates but does not move forward or backward in a straight line along the Z-axis, but the invention is not limited thereto. In another embodiment, the second barrel 120 may rotate and/or move in a straight line according to the extension method of the third groove 130r, and is not limited to the embodiments of the invention.

Referring to both FIG. 3 and FIG. 4. During the process in which the second barrel 120 in the wide-angle end continues to rotate to the telephoto end, the first pin 110p of the first barrel 110 is guided by the second groove 120r of the second barrel 120, such that the first barrel 110 may move in a straight line along the Z-axis until the telephoto end is reached. Meanwhile, the first barrel 110 is protruded to be over the first surface 120s1 of the second barrel 120 and the guider 150. That is, the first barrel 110 move forward positive Z-axis and is extended from the first surface 120s1 of the second barrel 120.

When the second barrel 120 rotates, the first barrel 110 may move between the position outside of the first surface 120s1 of the second barrel 120 and the position outside of the second surface 120s2 of the second barrel 120, such that the first barrel 110 moves with respect to the second barrel 120. As a result, the movement path of the first barrel 110 is prolonged. That is, the overall optical zooming path is prolonged, or the thinness (that is, the distance between the first surface 110s1 and the second surface 110s2) of the first barrel 110 is thinned, and the thinness (that is, the distance between the first surface 120s1 and the second surface 120s2) of the second barrel 120 is thinned to thin the whole thinness of the lens structure.

Figure 5:
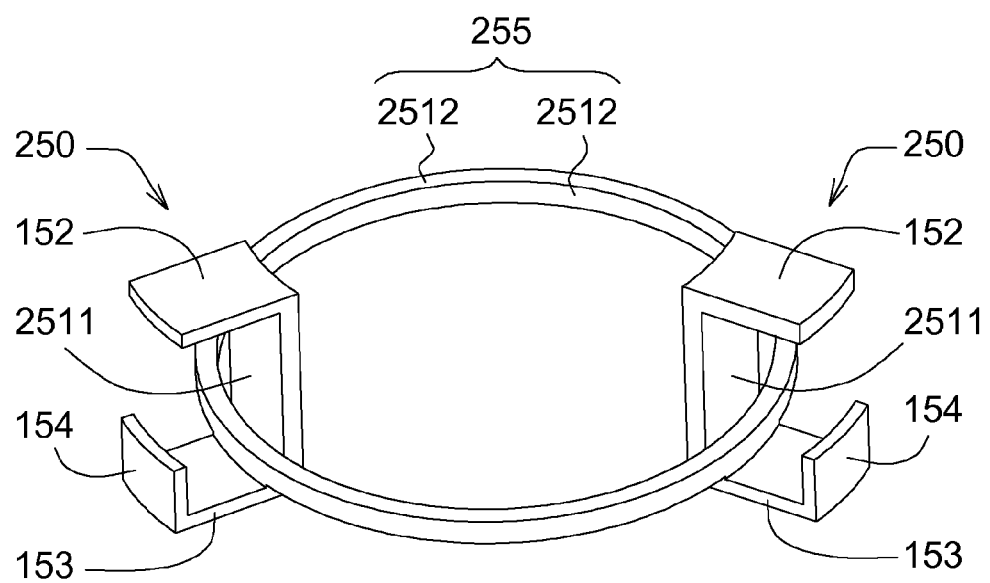
FIG. 5 shows an external view of a guider according to another embodiment of the invention.

Referring to FIG. 1 and FIG. 5. FIG. 5 shows an external view of a guider according to another embodiment of the invention. The lens structure 200 comprises at least one guider 250, a first barrel 110, a second barrel 120, a third barrel 130 and a fourth barrel 140. In the present embodiment, the quantity of the guider 250 is exemplified by two; however, such exemplification not meant to be limiting. The two guiders 250 are integrally formed in one piece, and may be formed by using the injection molding technology, but the invention is not limited thereto. In another embodiment, the parts of the guiders 250 may be manufactured separately and then are assembled or bonded to form an integral structure.

Specifically, the main body 251 of each guider 250 may comprise a first connection portion 2511 and a second connection portion 2512. The first limiting portion 152 and the second limiting portion 153 are connected to the corresponding first connection portion 2511. The second connection portion 2512 is connected to the first connection portion 2511. Two adjacent second connection portions 2512 may be interconnected to form a ring piece 255. In another embodiment, the quantity of the guider 250 may be singular, and the second connection portion 2512 of the singular guider 250 may form a ring piece as well.

Figure 6:
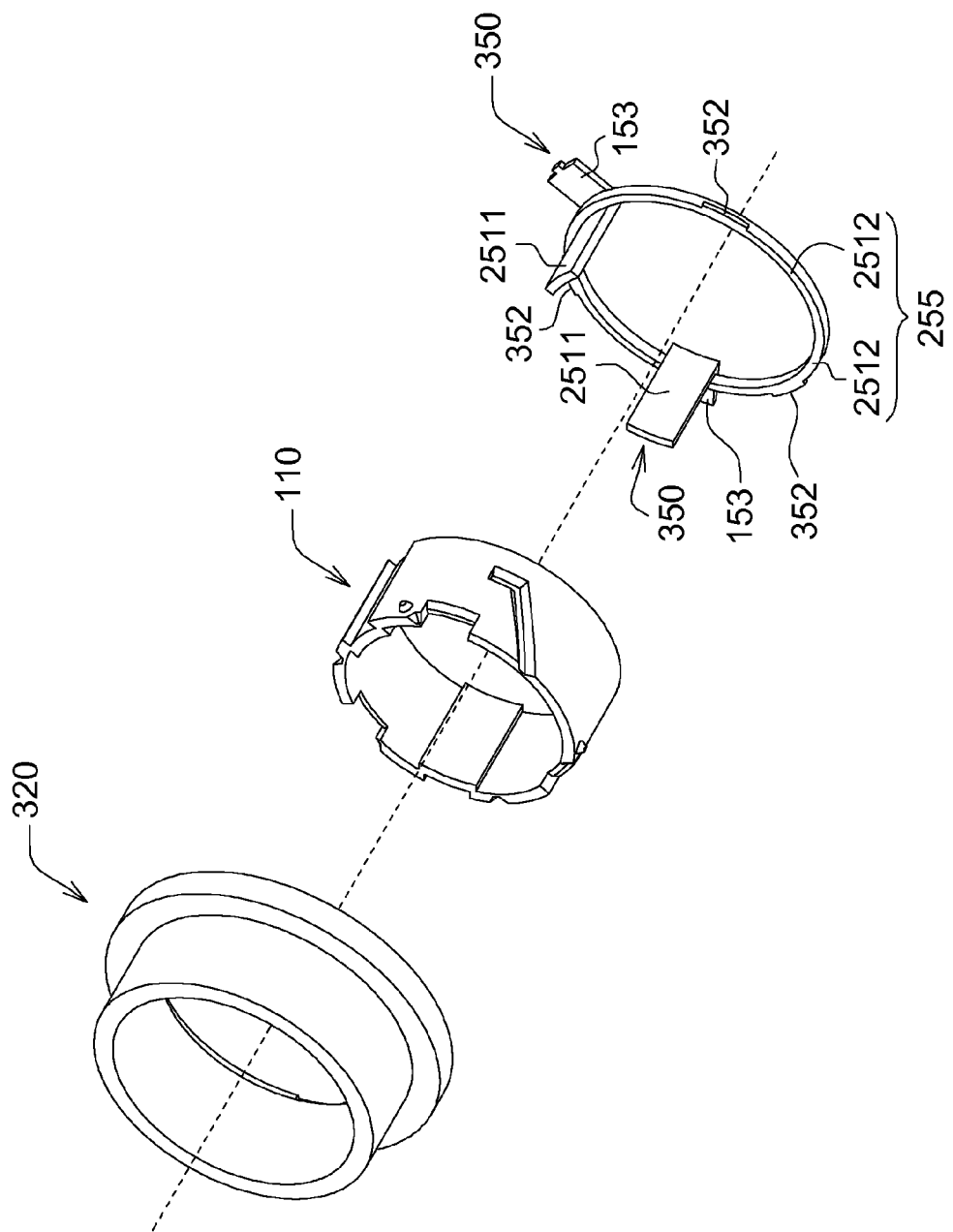
FIG. 6 shows a decomposition diagram of a first barrel, a second barrel and a guider according to another embodiment of the invention.

Referring to FIGS. 1, 2 and 6, a decomposition diagram of a first barrel, a second barrel and a guider according to another embodiment of the invention is shown.

The lens structure 300 comprises at least one guider 350, a first barrel 110, a second barrel 320, a third barrel 130, a fourth barrel 140 and at least one first limiting portion 352. The structure of the second barrel 320 is similar to that of the second barrel 120. In addition, the first limiting portion 152 may be connected to the first end 151e1 of the main body 151, the second connection portion 2512 or first connection portion 2511.

As indicated in FIG. 6, the quantity of the guider 350 is exemplified by two. Two guiders 350 are integrally formed in one piece, but the invention is not limited thereto. In another embodiment, the parts of the guiders 350 may be manufactured separately and then are assembled or bonded to form an integral structure.

Specifically, each guider 350 comprises a first connection portion 2511, a second connection portion 2512, and a second limiting portion 153. The first connection portion 2511 comprises a first end 2511e1 and a second end 2511e2 opposite to the first end 2511e1. The second limiting portion 153 is connected to the second end 2511e2 of the first connection portion 2511. The second connection portion 2512 is connected to the first connection portion 2511. Two adjacent second connection portions 2512 are interconnected to form a ring piece 255. In another embodiment, the quantity of the guider 350 may be singular, and the second connection portion 2512 of the singular guider 350 may form a ring piece as well. The first limiting portion 352 may be set on the second connection member 2512 of the main body 151. Alternatively, several first position limit portions 352 may be separately disposed on the second connection member 2512. In another embodiment, the first limiting portion 352 is a ring structure disposed on the second connection member 2512.

As indicated in FIG. 6, the first limiting portion 352 is disposed on the second connection portion 2512, wherein the quantity of the first limiting portion 352 may be any number, and is exemplified by three in the present embodiment; however, such exemplification not meant to be limiting.

Figure 7:
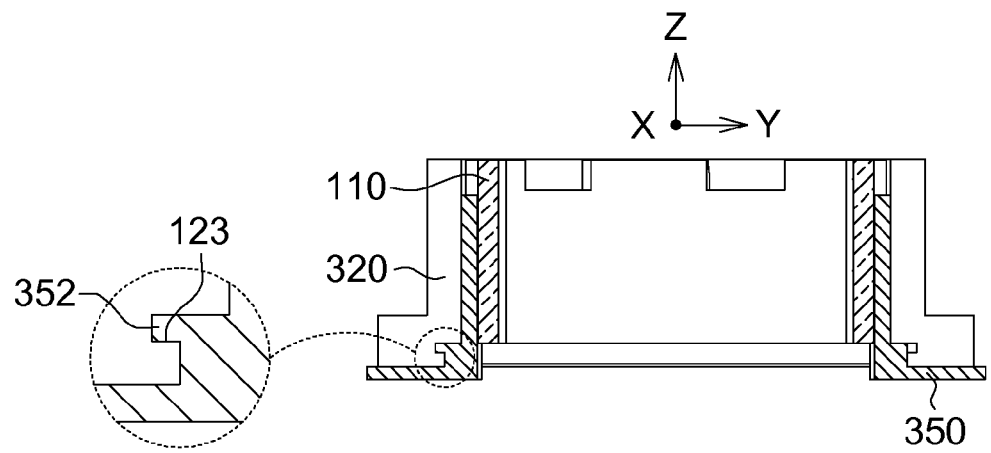
FIG. 7 shows a cross-sectional view of the guider, the first barrel and the second barrel of FIG. 6 being at a close end.

Referring to FIG. 7, a cross-sectional view of the guider, the first barrel and the second barrel of FIG. 6 being at a close end is shown. FIG. 7 only illustrates the guider 350, the first limiting portion 352, the first barrel 110 and the second barrel 320. The second barrel 320 comprises a ring groove 123 to which the first limiting portion 352 of the guider 350 may slide in accordance with the second barrel 320, such that the second barrel 320 is restricted by the first limiting portion 352 and moves in a straight line with respect to the guider 350.

Figure 8:
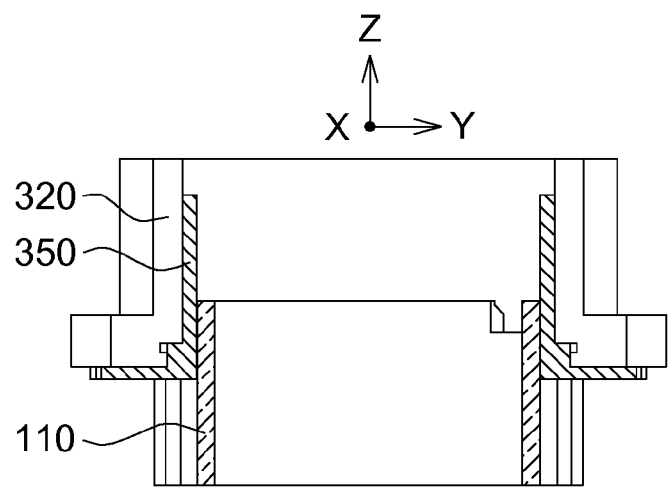
FIG. 8 shows a cross-sectional view of the guider, the first barrel and the second barrel of FIG. 6 being at a wide-angle end.

Referring to both FIG. 7 and FIG. 8. FIG. 8 shows a cross-sectional view of the guider, the first barrel and the second barrel of FIG. 6 being at a wide-angle end, wherein FIG. 8 only illustrates the guider 350, the first barrel 110 and the second barrel 320. Since the first limiting portion 352 and the ring groove 123 are mutually restricted, the guider 350 accordingly moves forward or backward in a straight line when the second barrel 320 of FIG. 7 moves in a straight line along the positive Z-axis.

Referring to FIG. 9, an expansion diagram of a first barrel of a lens structure according to another embodiment of the invention is shown. The first barrel 410 comprises a first pin 410p1 and a second pin 410p2, wherein, the first pin 410p1 and the second pin 410p2 may be respectively adjacent to the first surface 110s1 and the second surface 110s2 of the first barrel 410.

As indicated in FIG. 9, the first barrel 410 may comprise several first pins 410p1 and several second pins 410p2. For example, the quantity of the first pins 410p1 is the same as that of the second pin 410p2, and is such as two, three or any other numbers. Wherein, at least one first pin 410p1 forms a first pin group, and at least one second pin 410p2 forms a second pin group. In addition, the structure of the first pin 110p of the first barrel 110 may be similar to that of the first pin 410p1 and the second pin 410p2 of the first barrel 410. Furthermore, other structure (such as the first groove 110r) of the first barrel 410 may be similar to that of the first barrel 110, and the similarities are not repeated here.

Referring to FIG. 10, an expansion diagram of a second barrel of a lens structure according to another embodiment of the invention is shown. The second barrel 420 comprises a first surface 120s1, a second surface 120s2, at least one accommodation recess 421 and at least one continuous groove 420r. The first surface 120s1 and the second surface 120s2 are opposite to each other. The continuous groove 420r has openings 420a1 and 420a2 respectively exposed on the first surface 120s1 and the second surface 120s2.

As indicated in FIG. 10, the quantity of the continuous groove 420r may be the same with that of the accommodation recess 421, and is such as two, three or any other number. Besides, in the above embodiment, the structure of the second groove 120r of the second barrel 120 may be similar to that of the continuous groove 420r of the second barrel 420. Also, Furthermore, other structure of the second barrel 420 may be similar to that of the second barrel 120, and the similarities are not repeated here.

As indicated in FIG. 10, the continuous groove 420r comprises a first sub-groove 420r1, a second sub-groove 420r2 and a third sub-groove 420r3, the first sub-groove 420r1 is connected to the second sub-groove 420r2, the third sub-groove 420r3 extends to the second surface 120s2 of the second barrel 420 from the second sub-groove 420r2, and the second sub-groove 420r2 extends to the first surface 120s1 of the second barrel 420.

As indicated in FIG. 10, the continuous groove 420r further comprises a fourth sub-groove 420r4, which is connected to the first sub-groove 420r1 and extends to the second surface 120s2 of the second barrel 420 for exposing an opening 420a3 on the second surface 120s2, such that the first pin 410p1 of the first barrel 410 enters the continuous groove 420r through the opening 420a3 of the fourth sub-groove 420r4. Thus, the assembly is thus made easier and more convenient.

As indicated in FIG. 10, when the first barrel 410 and the second barrel 420 are at the close end, the first pin 410p1 is located within the continuous groove 420r and the second pin 410p2 is located within accommodation recess 421. In the present embodiment, the first pin 410p1 is adjacent to the junction between the fourth sub-groove 420r4 and the first sub-groove 420r1. Moreover, the relative positions between the first barrel 410 and the second barrel 420 in the close end after assembly are similar to that the first barrel 410 and the second barrel 420 of FIG. 2, and the similarities are not repeated here.

As indicated in FIG. 10, the first sub-groove 420r1 comprises a first rotation slot 420r11, a second rotation slot 420r12 and a third rotation slot 420r13. The second rotation slot 420r12 connects the first rotation slot 420r11 and the third rotation slot 420r13, and extends between the first surface 120s1 and the second surface 120s2. The first rotation slot 420r11 and the third rotation slot 420r13 only extend around the Z-axis of the second barrel 420, and the third rotation slot 420r13 is connected to the third sub-groove 420r3. In the present embodiment, the first rotation slot 420r11 and the third rotation slot 420r13 extend around the Z-axis, and the second rotation slot 420r12 simultaneously extends around and along the Z-axis, for example oblique extension, but the present embodiment is not limited thereto.

Figures 11, 12:
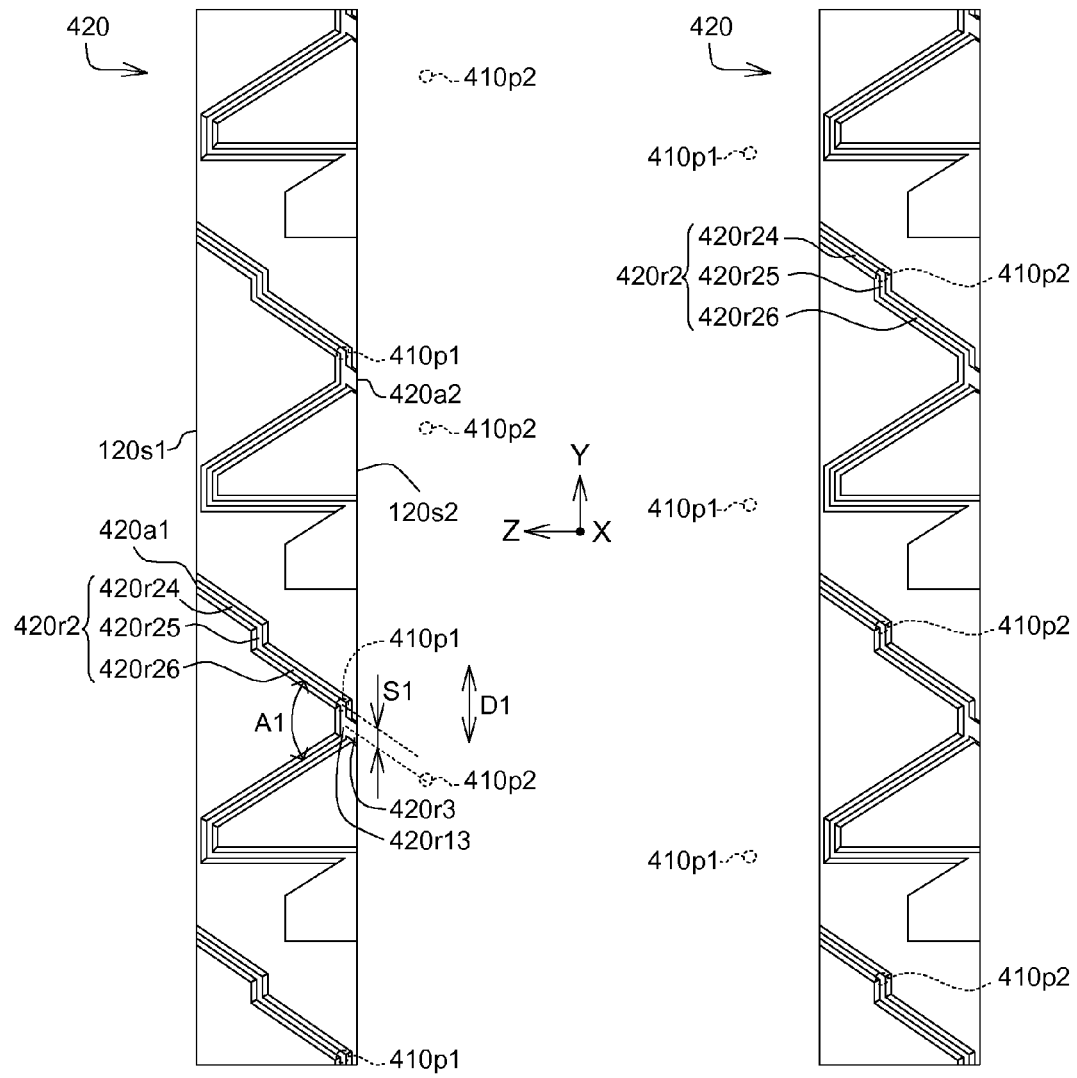
FIG. 11 shows a schematic diagram of the first barrel of FIG. 9 and the second barrel of FIG. 10 being at a wide-angle end.
FIG. 12 shows a schematic diagram of the first barrel of FIG. 9 and the second barrel of FIG. 10 being at a telephoto end.

Referring to FIG. 11, a schematic diagram of the first barrel of FIG. 9 and the second barrel of FIG. 10 being at a wide-angle end is shown. Moreover, the relative positions between the first barrel 410 and the second barrel 420 in the wide-angle end after assembly are similar to that the first barrel 110 and the second barrel 120 of FIG. 3, and the similarities are not repeated here.

During the process in which the first barrel 410 and the second barrel 420 are transferred to the wide-angle end (shown in FIG. 11) form the close end (shown in FIG. 10), the first pin 410p1 moves inside the continuous groove 420r, but the second pin 410p2 moves outside the second surface 120s2 of the second barrel 420 from the accommodation recess 421.

As indicated in FIG. 11, when the first barrel 410 and the second barrel 420 are at the wide-angle end, the first pin 410p1 is located inside the continuous groove 420r and the second pin 410p2 is located outside the second surface 120s2 of the second barrel 420.

As indicated in FIG. 11, the second sub-groove 420r2 comprises a fourth rotation slot 420r24, a fifth rotation slot 420r25 and a sixth rotation slot 420r26. The fourth rotation slot 420r24 connects the fifth rotation slot 420r25 and extends to the first surface 120s1 for exposing an opening 420a1 on the first surface 120s1. The fifth rotation slot 420r25 only extends around the Z-axis of the second barrel 420, and the sixth rotation slot 420r26 connects the fifth rotation slot 420r25 and the third rotation slot 420r13 and extends between the first surface 120s1 and the second surface 120s2. In the present embodiment, the fifth rotation slot 420r25 extends around the Z-axis, but the fourth rotation slot 420r24 and the sixth rotation slot 420r26 simultaneously extend around and along the Z-axis, for example oblique extension, but the present embodiment is not limited thereto. Moreover, in the present embodiment, an acute angle A1 is contained between the sixth rotation slot 420r26 and the second rotation slot 420r12, but the present embodiment is not limited thereto.

As indicated in FIG. 11, when the first barrel 410 and the second barrel 420 are at the wide-angle end, the first pin 410p1 is adjacent to the junction between the sixth rotation slot 420r26 and the third rotation slot 420r13. In the present embodiment, the fourth rotation slot 420r24 is substantially parallel to the sixth rotation slot 420r26, and the third sub-groove 420r3 is substantially parallel to the sixth rotation slot 420r26.

As indicated in FIG. 11, the fourth rotation slot 420r24 is separated from the sixth rotation slot 420r26 by a distance S1 along a direction D1, and the third sub-groove 420r3 may be separated from the sixth rotation slot 420r26 by the same distance S1 along the same direction D1, wherein the direction D1 may be a direction around the Z-axis. In addition, the first pin 410p1 of the first barrel 410 may be separated from the second pin 410p2 by the same distance S1 along a direction D1, such that the first pin 410p1 and the second pin 410p2 are smoothly and slideably set to the continuous groove 420r.

Referring to FIG. 12, a schematic diagram of the first barrel of FIG. 9 and the second barrel of FIG. 10 being at a telephoto end is shown. Moreover, the relative positions between the first barrel 410 and the second barrel 420 in the telephoto end after assembly are similar to that the first barrel 110 and the second barrel 120 of FIG. 4.

As indicated in FIGS. 11 and 12, during the process in which the first barrel 410 and the second barrel 420 are transferred to the telephoto end from the wide-angle end, the first pin 410p1 is moved to the outside of the second barrel 420 from the inside of the continuous groove 420r through the opening 420a1, and the second pin 410p2 is moved to the inside of the continuous groove 420r from the outside of the second barrel 420 through the opening 420a2.

As indicated in FIG. 12, when the first barrel 410 and the second barrel 420 are at the telephoto end, the first pin 410p1 is located on the outside of the second barrel 420 and the second pin 410p2 is located inside the continuous groove 420r, and is such as adjacent to the junction between the fourth rotation slot 420r24 and the fifth rotation slot 420r25.

According to the lens structure disclosed in the above embodiments of the invention, when the second barrel rotates, the first barrel may switch between the position at which the first barrel is protruded to be over the first surface of the second barrel and the position at which the first barrel is protruded to be over the second surface, such that the movement path of the first barrel is prolonged.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A lens structure having a wide-angle end, a telephoto end and an axis, comprising: a first barrel comprising a first pin and a second pin; a second barrel comprising a first surface perpendicular to the axis, a second surface opposite to the first surface and a continuous groove extending between the first surface and the second surface and having two openings respectively exposed on the first surface and the second surface; wherein at the wide-angle end, the first pin is inside of the continuous groove and the second pin is outside the second surface of the second barrel; and wherein at the telephoto end, the first pin is outside the first surface of the second barrel and the second pin is inside of the continuous groove, wherein the second barrel further comprises a space, during a collapsed status, the first in inside the continuous groove and the second in inside the space.

2. The lens structure according to claim 1, wherein the continuous groove comprises a first sub-groove, a second sub-groove and a third sub-groove, the first sub-groove connects to the second sub-groove, the third sub-groove extends to the second surface of the second barrel from the second sub-groove, and the second sub-groove extends to the first surface of the second barrel.

3. The lens structure according to claim 2, wherein the first sub-groove comprises a first rotation groove, a second rotation groove and a third rotation groove, the second rotation groove connects the first rotation groove and third rotation groove and extends between the first surface and the second surface.

4. The lens structure according to claim 3, wherein the first rotation groove and the third rotation groove extends around an axis of the second barrel, and the third rotation groove connects to the third sub-groove.

5. The lens structure according to claim 2, wherein the second sub-groove comprises a fourth rotation groove, a fifth rotation groove and a sixth rotation groove, the fourth rotation groove connects to the fifth rotation groove and extends to the first surface, the fifth rotation groove extends around an axis of the second barrel, the sixth rotation groove connects the fifth rotation groove and the third rotation groove and extends between the first surface and the second surface.

6. The lens structure according to claim 5, wherein at the wide-angle end, the first pin is adjacent to a junction between the fifth rotation groove and the third rotation groove.

7. The lens structure according to claim 5, wherein the fourth rotation groove is parallel to the sixth rotation groove, and the third sub-groove is parallel to the sixth rotation groove.

8. The lens structure according to claim 5, wherein the fourth rotation groove is separated from the sixth rotation groove by a distance along a direction, and the third sub-groove is separated from the sixth rotation groove by the distance along the direction.

9. The lens structure according to claim 5, wherein at the telephoto end, the second pin is adjacent to a junction between the fourth rotation groove and the fifth rotation groove.

10. The lens structure according to claim 2, wherein the continuous groove further a fourth sub-groove connects to the continuous groove and extends to the second surface of the second barrel, and during the collapsed status, the first pin is adjacent to a junction between the fourth sub-groove and the first sub-groove.

11. An electronic apparatus comprising the lens structure claimed in claim 1.

12. A lens structure, zooming from a wide-angle end to a telephoto end and having an axis, comprising: a first barrel comprising a first pin group and a second pin group; and a second barrel comprising a first surface perpendicular to the axis, a second surface opposite to the first surface and a continuous groove having two openings respectively exposed on the first surface and the second surface; wherein from the wide-angle end to the telephoto end, the first pin group slides in accordance with the continuous groove and be detached from the second barrel from the first surface; and wherein during the first pin group detaching from the second barrel, the second pin group slides in accordance with the continuous groove, wherein the second barrel further comprises a space, during the collapsed status, the first pin is inside the continuous groove and the second pin is inside the space.

13. An electronic apparatus comprising the lens structure claimed in claim 12.

14. A lens structure, zooming between a wide-angle end and a telephoto end and having an axis, and stored in a collapsed status, the lens structure comprising: a first barrel comprising a first pin and a second pin; and a second barrel comprising a first surface perpendicular to the axis, a second surface perpendicular to the axis and a continuous groove having two openings respectively exposed on the first surface and the second surface; wherein the first barrel slides in accordance with the continuous groove by the first pin and the second pin respectively to relatively move to the second barrel; wherein at the wide-angle end, the first pin is inside of the continuous groove and the second pin is outside the second surface of the second barrel via the opening exposed on the second surface; and wherein at the telephoto end, the first pin is outside the first surface of the second barrel via the opening exposed on the first surface and the second pin is inside of the continuous groove, wherein the second barrel further comprises a space, in a collapsed status, the first pin is inside the continuous groove and the second pin is inside the space.

15. An electronic apparatus comprising the lens structure claimed in claim 14.

* * * * *